United States Patent
Honaryar et al.

(10) Patent No.: US 11,448,854 B2
(45) Date of Patent: Sep. 20, 2022

(54) ANGLE ADJUSTMENT SYSTEM

(71) Applicant: Alcon Inc., Fribourg (CH)

(72) Inventors: Babak Honaryar, Orinda, CA (US); Mauricio Jochinsen, Fountain Valley, CA (US)

(73) Assignee: Alcon, Inc., Fribourg (CH)

( * ) Notice: Subject to any disclaimer, the term of this patent is extended or adjusted under 35 U.S.C. 154(b) by 188 days.

(21) Appl. No.: 16/790,970

(22) Filed: Feb. 14, 2020

(65) Prior Publication Data

US 2020/0271893 A1 Aug. 27, 2020

Related U.S. Application Data

(60) Provisional application No. 62/808,514, filed on Feb. 21, 2019.

(51) Int. Cl.
*G02B 7/18* (2021.01)
*G02B 7/182* (2021.01)

(52) U.S. Cl.
CPC ......... *G02B 7/1805* (2013.01); *G02B 7/1821* (2013.01)

(58) Field of Classification Search
CPC ............................ G02B 7/1805; G02B 7/1821
USPC .............................. 359/226.1, 226.2, 831, 872
See application file for complete search history.

(56) References Cited

U.S. PATENT DOCUMENTS

| | | | | |
|---|---|---|---|---|
| 5,529,277 A * | 6/1996 | Ostaszewski | ...... | F16M 11/2021 248/629 |
| 6,265,239 B1 * | 7/2001 | Aksyuk | ................. | B81B 7/0003 438/51 |
| 6,337,760 B1 * | 1/2002 | Huibers | ............... | G02B 6/3518 359/223.1 |
| 6,445,514 B1 * | 9/2002 | Ohnstein | ................ | G02B 7/005 359/813 |
| 6,556,737 B1 * | 4/2003 | Miu | .................... | G02B 26/0833 359/224.1 |
| 6,905,259 B2 | 6/2005 | Smith | | |
| 6,935,759 B1 * | 8/2005 | Staker | ................... | B81B 3/0062 359/872 |
| 7,009,786 B2 | 3/2006 | Bedzyk | | |
| 7,190,854 B1 * | 3/2007 | Novotny | .............. | G02B 6/3518 385/18 |
| 8,508,868 B2 | 8/2013 | Weber | | |
| 9,448,384 B2 | 9/2016 | Erath | | |
| 9,506,756 B2 | 11/2016 | Mcneil | | |
| 9,668,645 B2 | 6/2017 | Wheatley | | |
| 9,810,920 B2 | 11/2017 | Siegrist | | |
| 10,254,559 B2 | 4/2019 | Niederer | | |
| 2005/0052760 A1 * | 3/2005 | Weber | ................. | G02B 7/1805 359/819 |

(Continued)

FOREIGN PATENT DOCUMENTS

DE 10261594 A1 7/2004

*Primary Examiner* — Ricky D Shafer

(57) ABSTRACT

Certain aspects of the present disclosure provide to angle adjustment systems using one or more spring arrangements. In certain aspects, an angle adjustment system comprises a component and a first spring arrangement coupled to the component, wherein the first spring arrangement comprises at least three spring elements. Further, the first spring arrangement is configured to allow the component to rotate around a first axis of rotation and prevent a first translational movement of the component with respect to the first axis of rotation.

22 Claims, 13 Drawing Sheets

(56) References Cited

U.S. PATENT DOCUMENTS

2009/0244676 A1* 10/2009 Uchiyama .......... G02B 26/101
   257/E21.001
2020/0088993 A1   3/2020 Mathuni

* cited by examiner

ANGLE ADJUSTMENT SYSTEM

PRIORITY CLAIM

This application claims the benefit of priority of U.S. Provisional Patent Application Ser. No. 62/808,514 titled "Angle Adjustment System", filed on Feb. 21, 2019, whose inventors are Babak Honaryar and Mauricio Jochinsen, which is hereby incorporated by reference in its entirety as though fully and completely set forth herein.

INTRODUCTION

The present disclosure relates generally to angle adjustment systems.

In certain cases, the position of one or more components within a device may need to be maintained at certain angle(s). For example, optical devices, such as microscopes, stereoscopes, etc., include optical components, such as reflective elements or optical lenses for deflecting beams of light (e.g., substantially collimated beams of light). During the manufacturing process, the optical components are positioned at certain angle(s) within the corresponding optical device to deflect the beams of light in a desired direction/at a desired angle. During use of the optical device, a user may further adjust the angle(s) at which the optical component is positioned by rotating the optical component around a certain axis of rotation to change the direction in/angle at which beams of light are deflected.

In certain cases, even after the position of the components of a device have been set (e.g., during manufacture, by a user, etc.), the components may move in different directions (e.g., lateral or translational movements). These undesired movements may occur due to a variety of reasons, such as turbulence during the shipment of the optical devices, etc.

BRIEF SUMMARY

The present disclosure relates to angle adjustment systems using one or more spring arrangements.

Certain aspects provide a component and a first spring arrangement coupled to the component, wherein the first spring arrangement comprises at least three spring elements. Further, the first spring arrangement is configured to allow the component to rotate around a first axis of rotation and prevent a first translational movement of the component with respect to the first axis of rotation.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide an angle adjustment system with one or more spring arrangements for adjusting the angular position of a component with respect to at least one axis of rotation while preventing a translational movement or repositioning of the component with respect to the axis of rotation.

As described above, in many cases, a component within a device may be positioned at a certain angle during the manufacturing process but experience inadvertent or undesired movement in different directions at a later point in time.

Figure 1:
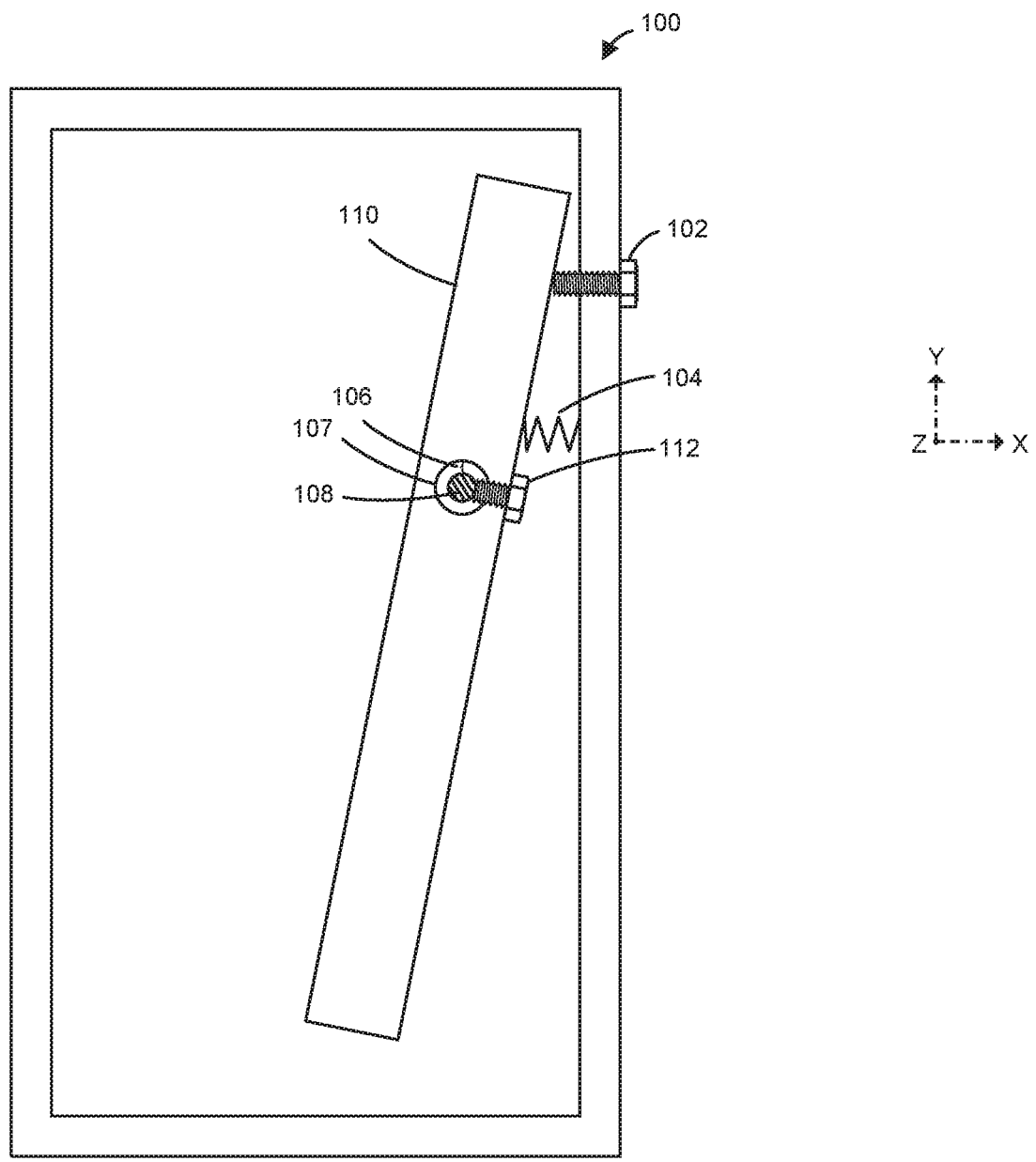
FIG. 1 illustrates cross-sectional view of an example prior art device, within which a component is positioned at a certain angle, according to some embodiments.

FIG. 1 illustrates a cross-sectional view of an example prior art device 100, within which component 110 (e.g., a mirror) is positioned at a certain angle. As shown, component 110 comprises a hollow cylindrical housing 107 for housing a shaft 108 therein that allows component 110 to rotate around an axis of rotation at the center of shaft 108. Device 100 further comprises an adjustment element 102, tightening of which causes component 110 to rotate (e.g., counter clockwise) around shaft 108. A spring 104 is attached to component 110 and device 100 to help with the alignment of component 110 by providing a counter-force in a direction opposite to the direction of component 110's rotation in order to ensure that component 110 is kept in place and also does not rotate excessively as a result of a minor rotation force applied by adjustment element 102. Also, once component 110 is adjusted at a certain desirable angle, adjustment element 112 may be used so that the angular position of component 110 is maintained by eliminating any clearance (e.g., gap 106) between component 110 and shaft 108. An angular position of a component refers to an angle the component makes with respect to an axis perpendicular to at least one axis of rotation as compared to the component being in its normal state. A component is in its normal state if it has not experienced any rotation with respect to the axis perpendicular to the at least one axis of rotation.

As shown in FIG. 1, there is a gap 106 between housing 107 and shaft 108. Note that the size of gap 106 in FIG. 1 is exaggerated for illustration purposes. In real applications, gap 106 may be, for example, much smaller than a millimeter. However, even a very small gap between housing 107 and shaft 108 may make component 110 susceptible to translational movement along the X, Y, Z axes. As described above, such movements may be caused due to many different reasons including turbulence during the shipment of device 100, use of device 100 over time, etc. For example, during shipment of device 100, component 110 may move along the X, Y, or Z axes. An example cause of this may be a loosening of adjustment element 112. As a result of such movements, component 110's position (including angular position), may change, thereby, affecting the functionality of device 100.

FIG. 1 only shows one example of a prior art device that is unable to maintain the position of a component therein, which may result from the component's translational movement along one or more X, Y, and Z axes. Other prior art devices may have completely different arrangements but still suffer from the same deficiency. For example, as described above, in the example of FIG. 1, gap 106 is a contributing factor to component 110's translational movement. However, in other prior art arrangements, a component may experience translational movement due to other factors.

Also, the aspects described herein are applicable regardless of the type of component whose position is required to be maintained within a device. For example, in certain aspects, the component is an optical component and, in other aspects, the component is a non-optical component. Examples of an optical component include a prism (e.g., cube prism, right-angle prism, etc.), mirror, lens, etc.

Figure 2A:
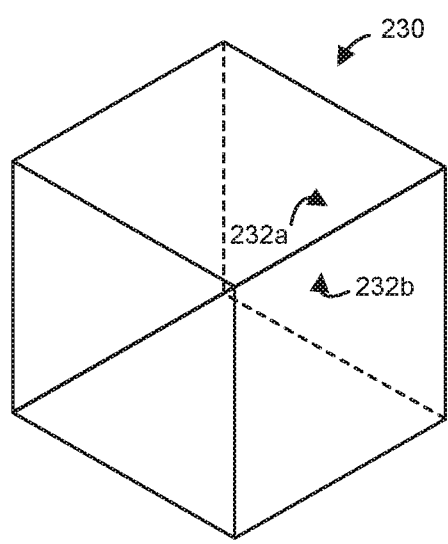
FIG. 2A shows an example of a cube-shaped optical component, according to some embodiments.

FIG. 2A shows an example of a cube-shaped optical component 230. In certain aspects, component 230 may be a cube prism or beam-splitter. In certain aspects, component 230 may be used in an augmented reality device (e.g., a 3D heads up display (HUD)). Component 230 is used in FIGS. 4-7 to illustrate certain aspects described herein. However, as described above, any other component (e.g., other optical components as well as non-optical components) may benefit from or also be used in conjunction with the aspects described herein.

Figure 2B:
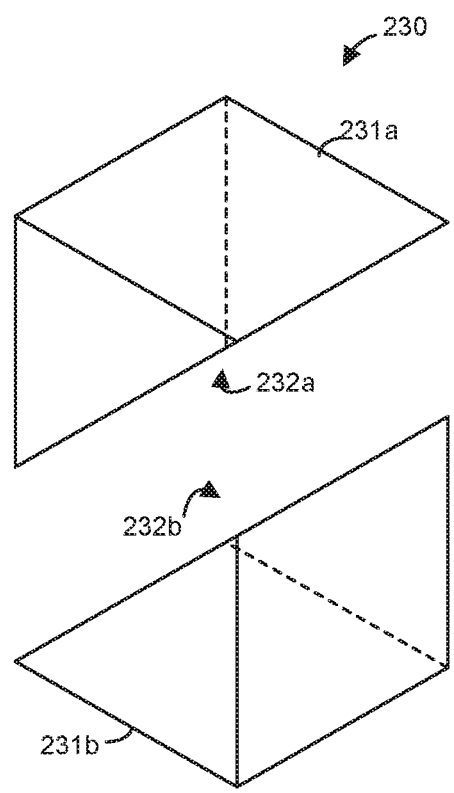
FIG. 2B shows example right-angle prisms that are assembled together to produce the cube-shaped optical component of FIG. 2A, according to some embodiments.

FIG. 2B illustrates component 230 in more detail. As shown in FIG. 2B, component 230 comprises two matching right-angle prisms 231a and 231b, with hypotenuse faces 232a and 232b, respectively. Prisms 231a and 231b are transparent and may be made from material such as glass, plastic, fluorite, or other transparent material. In certain aspects, a partially reflecting film is deposited onto the hypotenuse face of one of prisms 231a or 231b. In other words, one of 232a and 232b is treated with partially reflecting film. To fabricate component 230, hypotenuse faces 232a and 232b of prisms 231a and 231b, respectively, are then cemented together. During use, a light beam may enter component 230 through the prism that has been coated with reflecting film so that reflection occurs before the beam encounters the optical cement used to fabricate component 230.

Figure 3A:
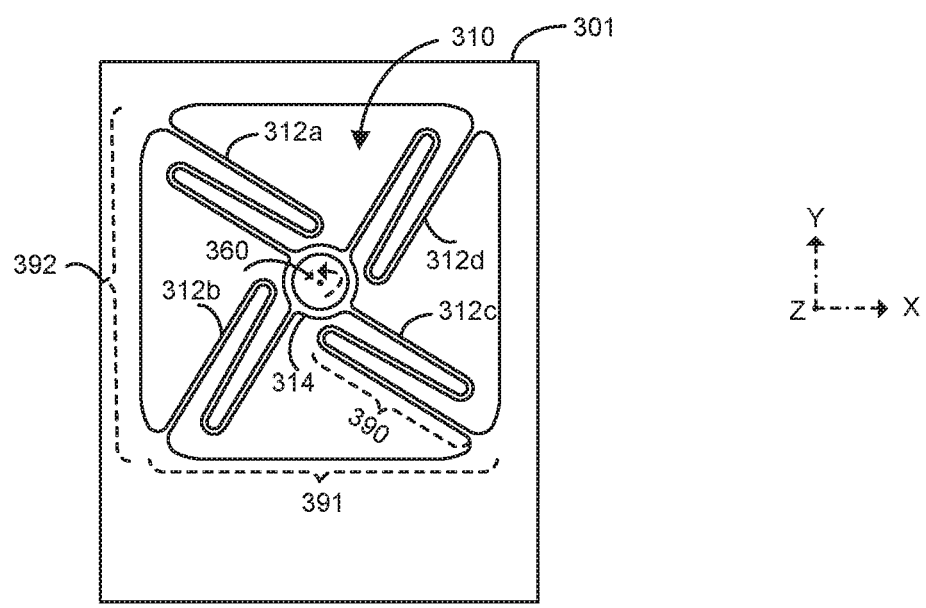
FIG. 3A illustrates an example spring arrangement within a frame for adjusting the angular position of a component, according to some embodiments.

FIG. 3A illustrates a spring arrangement 310 within a frame 301 for adjusting the angular position of a component, such as component 230 of FIG. 2A. As shown, spring arrangement 310 comprises four serpentine-shaped spring elements 312a-312d. Spring arrangement 310 also comprises a housing element 314. Housing element 314 is a circular or ring-shaped element, although, in certain aspects, it may have other geometrical shapes such as a polygon. One end of each of the four elements 312a-312d is coupled to housing element 314 while the other end of each of the four elements 312a-312d is coupled to frame 301. The orientation (e.g., angular relationship or the location of the attachment) between the spring elements 312a-312d and the frame 301 can be modified to optimize the translational stiffness of spring arrangement 310 in a desired direction without significantly affecting the rotational stiffness of spring arrangement 310. The function of elements 312a-312d, as further described below, is to apply counter forces to any translational or rotational movement. For example, elements 312a-312d impose very large counterforces against translational movements and, therefore, discourage such movements, but allow pure rotational movements constrained and controlled by an appropriate torsional spring force to facilitate angular adjustments of a component under a biasing torsional load.

In the example of FIG. 3A, frame 301 and spring arrangement 310 are manufactured as one piece. In other words, elements 312a-312b are built in to the geometry of frame 301. In certain aspects, frame 310 is molded out of a plastic material with a high modulus of elasticity. For example, the plastic material may comprise PEEK (PolyEtherEtherKetone). Other examples include plastics with high modulus, such as PolySulfone, PolyEtherlmide, PolyOxyMethylene, and many other filled plastics, as long as the deflection necessary for the intended angular movement of spring arrangement 310 does not create stress beyond the yield strength of the material (e.g., the material should be and remain elastic). In certain other aspects, frame 301 with the built-in spring arrangement 310 is made out of a metal, which may be machined, cast, molded using powder metal injection, or stamped out of a sheet-metal.

The spring architecture shown in FIG. 3A (e.g., including frame 301 and spring arrangement 310) reduces the number of parts necessary to create a spring-loaded adjustment mechanism, thereby, reducing the associated costs and the manufacturing complexity while increasing reliability.

Although spring arrangement 310 of FIG. 3A comprises four elements 312a-312d, in certain aspects, spring arrangement 310 may comprise a smaller number of elements. For example, spring arrangement 310 may comprise at least three elements. Spring arrangement 310 may also comprise a larger number of elements than four. For example, spring arrangement 310 may comprise six, eight, or ten elements. In another example, spring arrangement 310 may comprise only up to eight elements. Also, although in FIG. 3A frame 301 and spring arrangement 310 are one piece, in certain aspects, frame 301 and spring arrangement 310 may be separate elements that are able to be coupled together. In addition, although housing element 314 is shown as a circular element in FIG. 3A, in certain aspects, housing element 314 may take another shape, such as a square, rectangle, or any other non-circular shape.

As described in further detail below, housing element 314 is capable of being coupled to or housing a connecting element (e.g., connecting element 415a shown in FIG. 4A) that is itself coupled or cemented rigidly to a component (e.g., component 230 of FIG. 2A). The component may then be rotated clockwise or counter clockwise around an axis of rotation 360. Axis 360 is parallel to the Z axis shown to the right of FIG. 3A and perpendicular to the X and Y axes (i.e., X-Y plane). Spring arrangement 310 allows spring-loaded rotations of the component coupled to housing element 314 while preventing translational movements of the component.

A translational movement refers to a movement of the center point of the component or housing element 314 along the X, Y, and Z axes, as shown to the right of FIG. 3A. A translational movement is different from a rotational movement in that in a rotational movement the center point of the component does not move along the X, Y, and Z axes.

Spring arrangement 310 may have a height 392 and length 391, which, in one example, may both be 0.73 inch. In certain aspects, height 393 and length 391 are different. Also, in one example, a sub-element of spring element 312c may have a length of 0.4 inch. The same measurement applies to the other spring elements 312. One of ordinary skill in the art recognizes that these measurements are merely exemplary and that spring arrangements 310 and spring elements 312 may, in other examples, have larger or smaller measurements and still function as described herein.

Figure 3B:
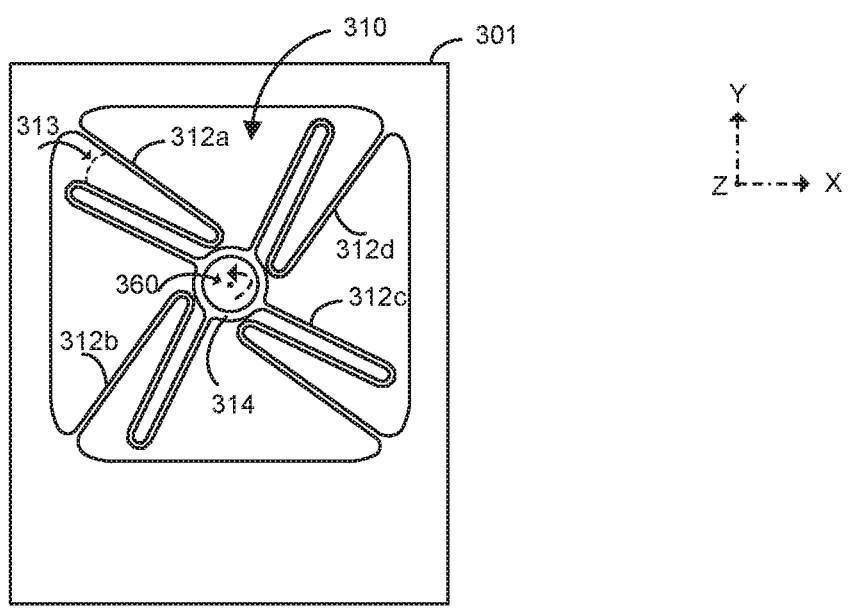
FIG. 3B illustrates the spring arrangement of FIG. 3A in a different state as a result of a rotation, according to some embodiments.

Note that in FIG. 3A, elements 312a-312d of spring arrangement 310 are shown to be at rest. In other words, no force or load resulting from a rotation is applied to elements 312a-312d. FIG. 3B, on the other hand, illustrates elements 312a-312d bending due to force applied as a result of a counter clockwise rotation. As shown in FIG. 3B, because of the rotation, each of the serpentine-shaped spring elements 312a-312d is bent such that a bigger gap, shown as gap 313, now exists between the sub-elements.

Figure 4A:
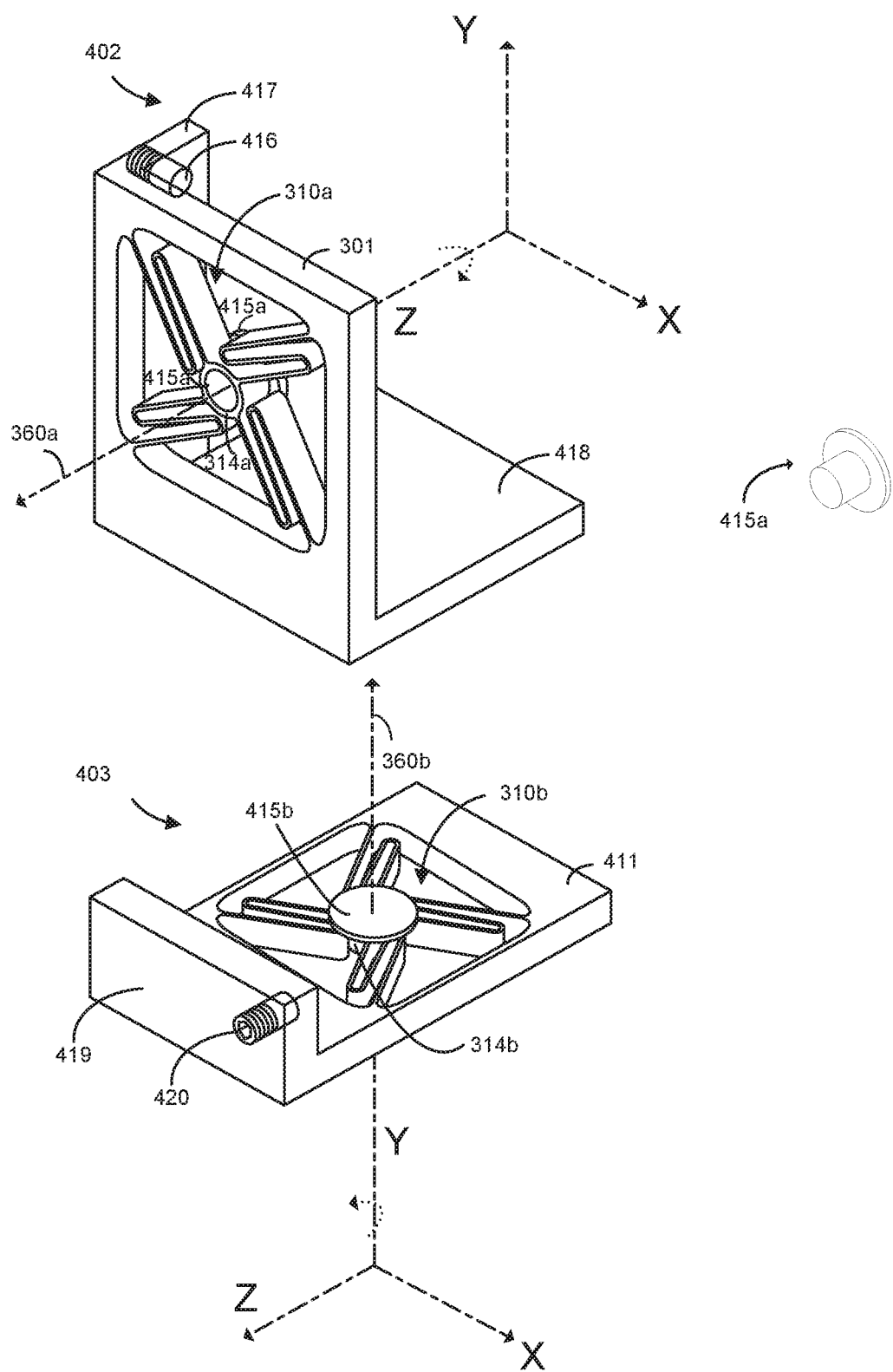
FIG. 4A illustrates two example separate brackets each comprising a spring arrangement, according to some embodiments.
Figure 4B:
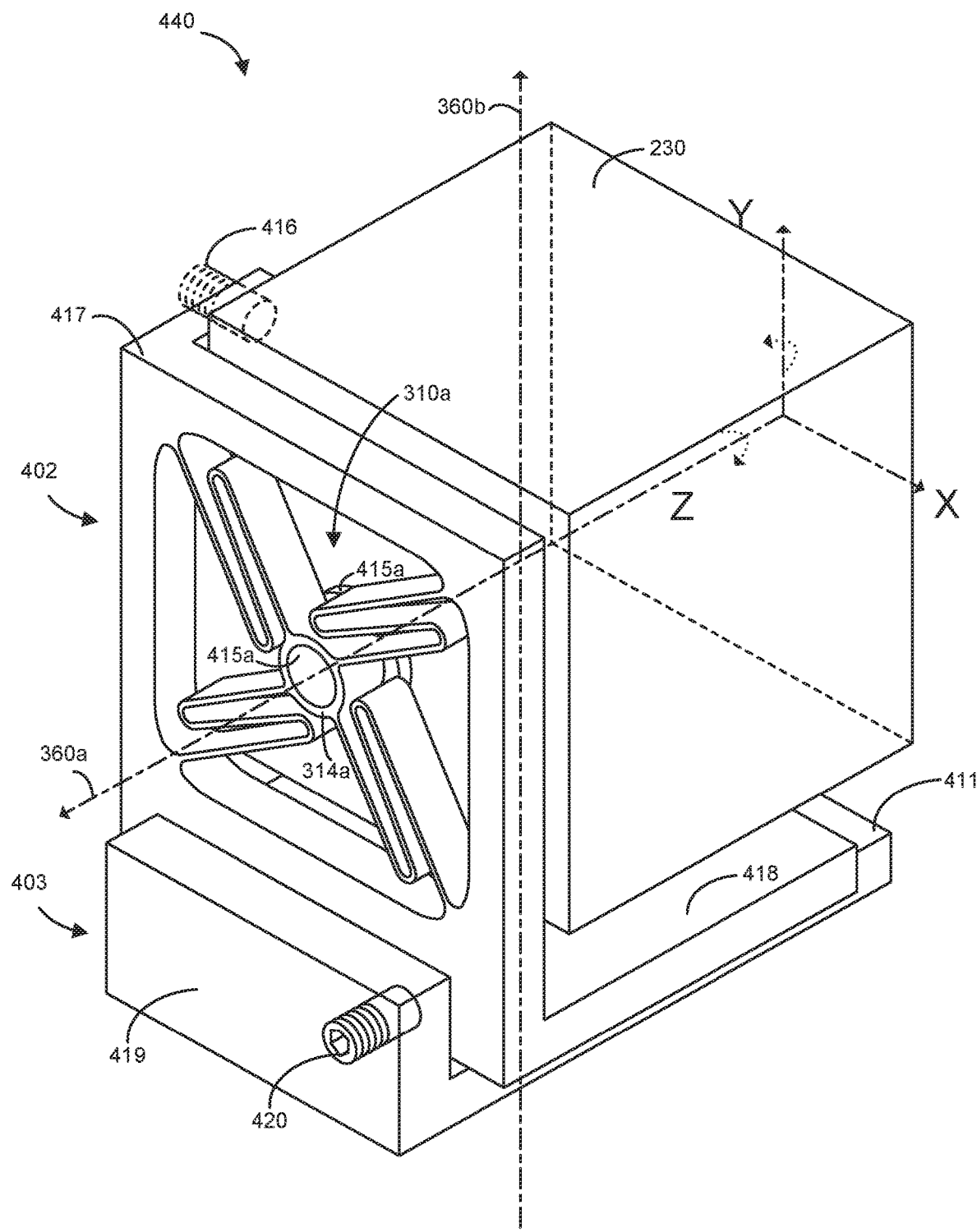
FIG. 4B illustrates an example angle adjustment system comprising the brackets of FIG. 4A assembled together along with the component of FIG. 2A.

FIGS. 4A and 4B illustrate an example of how spring arrangement 310 is used in brackets 402 and 403 to enable rotating a component, such as component 230, around multiple axes. FIG. 4A illustrates brackets 402 and 403 separately while FIG. 4B illustrates an assembled arrangement of brackets 402 and 403 along with component 230.

FIG. 4A illustrates an example bracket 402, which comprises frame 301 and spring arrangement 310a (e.g., same as spring arrangement 310 of FIGS. 3A and 3B) as well as plane 417 and plane 418. As shown, planes 417 and 418 are both perpendicular to frame 301, although in some other aspects that may not be the case. In certain aspects, bracket 402 is manufactured as one piece. In other aspects, one or more of frame 301, plane 417, and plane 418 may be separate pieces that are then coupled together to assemble bracket 402.

Plane 417 houses an adjustment element 416 that is able to cause a rotation of component 230 (e.g., shown in FIG. 4B) around axis 360a in a clockwise manner. In the example of FIG. 4A, adjustment element 416 is a screw. Advancing or retracting adjustment element 416 causes a rotation of component 230 that is coupled to spring arrangement 310a. As described above, spring arrangement 310a comprises a housing element 314a that is coupled to or houses a connecting element 415a. Connecting element 415a is separately shown to the right of bracket 402. Connecting element 415a comprises a first cylindrical end that is inserted into or housed by housing element 314a. Connecting element 415a also comprises a second cylindrical end with a larger diameter and a shorter width, as compared to the first cylindrical end, that is coupled to component 230, as shown in FIG. 4B. Note that cylinder element 415a is only one example of an element for coupling spring arrangement 310a and component 230, however several other geometries can also serve the same purpose.

In certain aspects, connecting element 415a is a separate element that is coupled to housing element 314a using a well-known technique. For example, housing element 314a and connecting element 415a may be glued together using an adhesive, or press-fit together. In other aspects, connecting element 415a is manufactured with spring arrangement 310a, which include housing element 314a, as one piece.

As shown, spring arrangement 310a allows a rotation around axis 360a while preventing a movement or repositioning of component 230 with respect to axis 360a, as further described in relation to FIG. 4B. On the other hand, spring arrangement 310b of bracket 403 allows a rotation around axis 360b (parallel to the Y axis) while preventing a movement or repositioning of component 230 with respect to axis 360b. As shown, bracket 403 comprises frame 411, which includes spring arrangement 310b, and plane 419. Note that, in certain aspects, spring arrangements 310a and 310b are similar in shape, size, material, and the number of spring elements. However, in other aspects, spring arrangements 310a and 310b are different. For example, spring arrangement 310a may be smaller or have fewer spring elements than spring arrangement 310 or vice versa. In certain aspects, spring arrangement 310a and 310b are perpendicular to each other. In certain aspects, axis 360a and 360b are perpendicular to each other.

Plane 419 is perpendicular to frame 411, although in certain aspects that might not be the case. In certain aspects, bracket 403 is manufactured as one piece. In other aspects, one or more of frame 411 and plane 419 may be separate pieces that are then coupled together to assemble bracket 403. As shown, plane 419 comprises adjustment element 420 that is able to cause a rotation of component 230 around axis 360b in a counter clockwise manner. In the example of FIG. 4A, adjustment element 420 is a screw. Advancing or retracting adjustment element 420 causes a rotation of bracket 402 and, in turn, a rotation of component 230 that is coupled to bracket 402. As shown, spring arrangement 310b comprises a housing element 314b that is coupled to connecting element 415b. In certain aspects, connecting element 415b is similar in shape and material to connecting element 415a. However, in other aspects, connecting element 415b and connecting element 415a are different.

In certain aspects, housing element 314b and connecting element 415b may be separate elements that are coupled to each other using a well-known technique. For example, the housing element 314b and the connecting element 415b may be glued together using an adhesive, or press-fit together. In other aspects, connecting element 415b is manufactured with spring arrangement 310b, which includes housing element 314b, as one piece. Connecting element 415b is used to connect spring arrangement 310b to bracket 402. FIG. 4B illustrates this assembly in further detail.

FIG. 4B shows an example angle adjustment system 440 comprising brackets 402 and 403 assembled together. FIG. 4B also shows component 230 being coupled to housing element 314a of spring arrangement 310a through connecting element 415a. As shown, tightening adjustment element 416 causes a clockwise rotation of component 230 around axis 360a. Also, tightening adjustment element 420 causes a counter clockwise rotation of bracket 402 around axis 360b. As described above, spring arrangements 310a and 310b allow such rotations while preventing translational movements of component 203. For example, spring arrangement 310a allows for the rotation of component 230 around axis 360a while preventing a translational movement of component 230 with respect to axis 360a (e.g., with respect to the position of axis 360a on the X and Y axes). In other words, spring arrangement 310a prevents a movement or repositioning of component 230 along the X and Y axes. Spring arrangement 310a prevents movement along the X and Y axes because spring elements 312a-d are arranged such that the aggregate of all spring forces generated at housing element 214 is zero when spring arrangement 310 is at equilibrium. As a result, when the component is temporarily moved along the X and Y axis with respect to axis 360a, spring elements 312 apply spring force to component 230 to bring it back to its original position with respect to axis 360a, thereby, ensuring that spring arrangement 310 is at equilibrium again. Further, spring arrangement 310a also prevents translational movement of component 230 along axis 360a.

Spring arrangement 310b allows for the rotation of bracket 402 and accordingly component 230 around axis 360b, which is parallel to the Y axis, while preventing a translational movement of bracket 402 and accordingly component 230 with respect to axis 360b (e.g., with respect to the position of axis 360b on the X and Z axes). In other words, spring arrangement 310b prevents a movement or repositioning of component 230 along the X and Z axes. Note that preventing a translational movement refers to preventing a permanent repositioning or movement of component 230 in a translational manner. In other words, as described above, component 230 may temporarily move in a translational manner but be pulled back to its original position by spring arrangement 310a and 310b.

Although angle adjustment system 440 comprises two brackets 402 and 403, in certain aspects, system 440 may only use one bracket (e.g., bracket 402 or 403) to allow for rotation of component 230 only along one axis of rotation. Either one of brackets 402 and 403 is able to provide a rotationally flexible but translationally rigid spring arrangement.

Another advantage of spring loaded angle adjustment system 440 is that it reduces the adjustment backlash associated with adjusting the angular position of component 230. Adjustment backlash refers to the clearance or lost motion between gear teeth of a gear train that may be used by a device that comprises angle adjustment system 440 in order to adjust the angular position of component 230.

Figure 5:
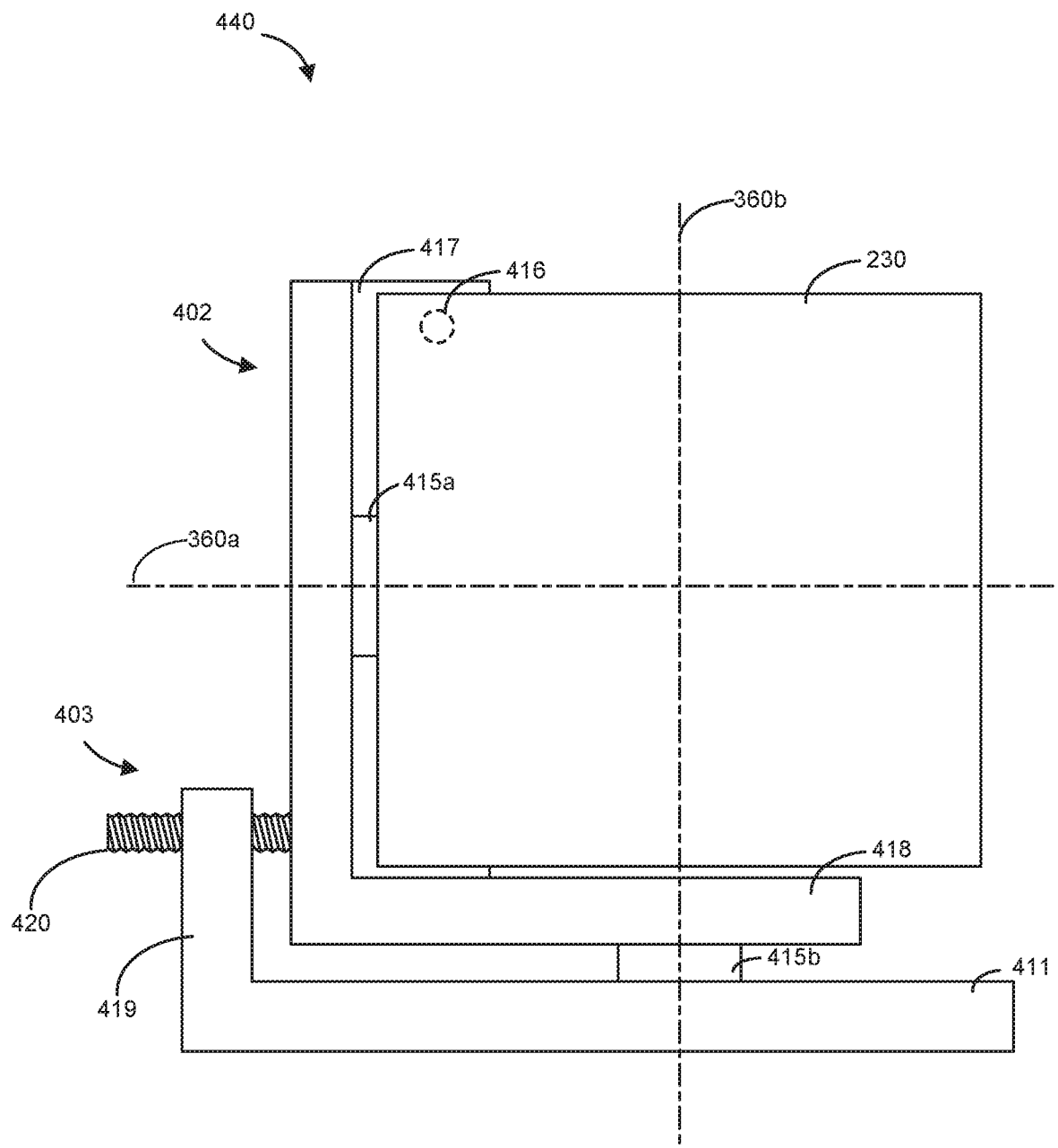
FIG. 5 illustrates an example cross-sectional view of the angle adjustment system of FIG. 4B, according to some embodiments.

FIG. 5 illustrates a cross sectional view of angle adjustment system 440 of FIG. 4B. As shown, component 230 is coupled to connecting element 415a, which is itself coupled to bracket 402 through a housing element (e.g., housing element 314a) of bracket 402's spring arrangement (e.g., spring arrangement 310a). Component 230 may be coupled to connecting element 415a using a well-known technique. For example, component 230 and connecting element 415a may be glued using an adhesive. FIG. 5 also shows bracket 402 being coupled to connecting element 415b, which itself is connected to bracket 403 through a housing element (e.g., housing element 314b) of bracket 403's spring arrangement (e.g., spring arrangement 310b). Also, FIG. 5 shows adjustment element 420, which is configured to rotate bracket 402 around axis 360b, as well as adjustment element 416, which is configured to rotate component 230 around axis 360a.

In the aspects described above and shown in FIGS. 4A-4B and 5, adjustment elements 420 and 416 are screws. However, other mechanisms, including an eccentric cam, a clamp locking mechanism, etc., may be used in other aspects. In certain aspects, adjustment elements 416 and 420 may be motorized instead of manual. Also, a motor-driven leadscrew (e.g., such as in adjustment element 850 of FIGS. 8A-8D) driving a slide can achieve the same purpose as a screw that is adjusted manually. A piezo driven rod can also serve as an adjustment element.

Figure 6:
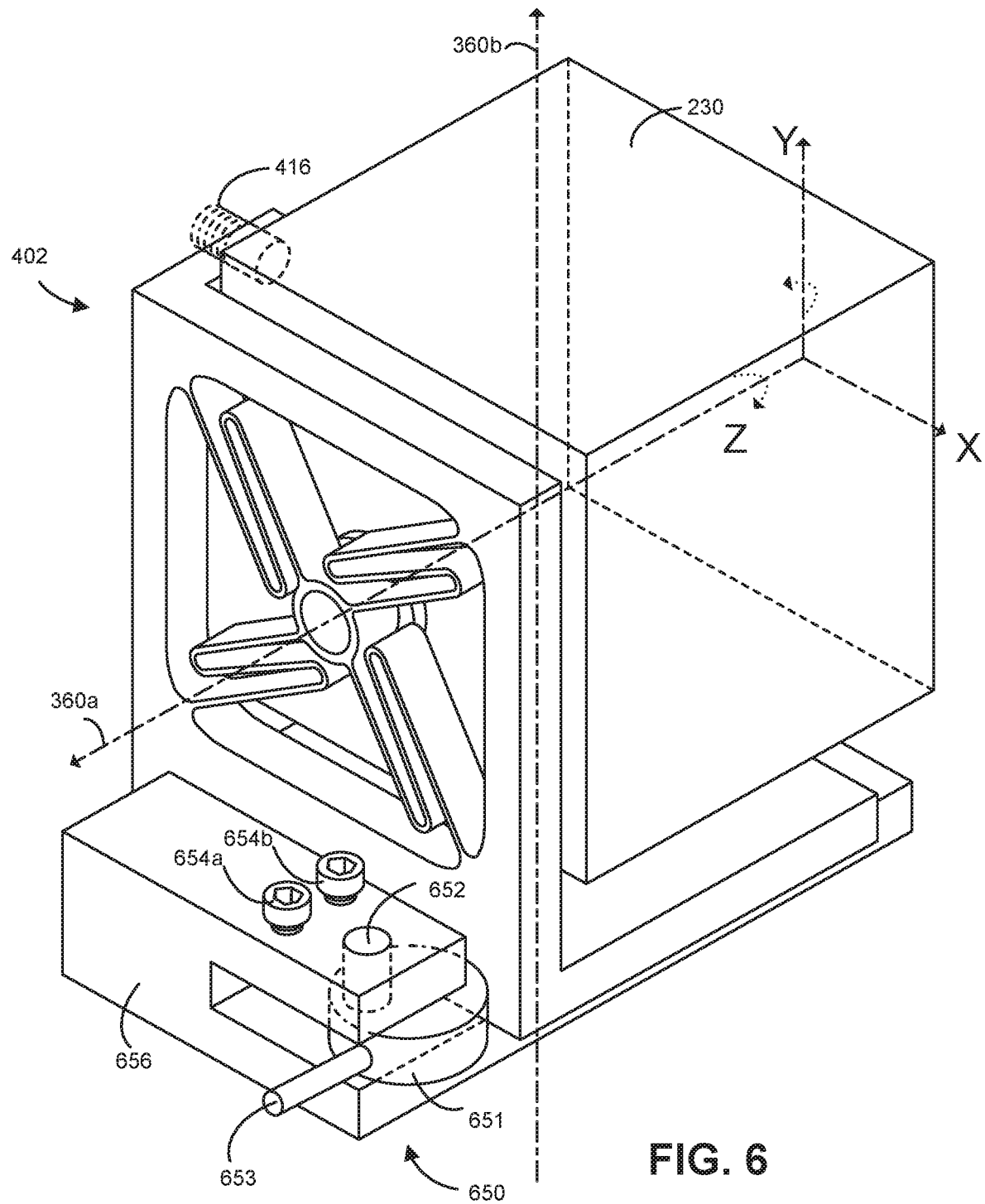
FIG. 6 illustrates an example angle adjustment system with an adjustment element comprising an eccentric cam, according to some embodiments.

FIG. 6 illustrates an example adjustment element 650, comprising an eccentric cam, which is used to rotate component 230 around axis 360b. An eccentric cam is a disc with its center of rotation positioned "off center." As shown, adjustment element 650 comprises a disc 651 with a shaft 652 that acts as the center of rotation for disk 651. Adjustment element 650 also comprises a handle 653 that is used to rotate disc 651 around shaft 652. For example, by rotating 653 in a counter clockwise manner, disc 651 rotates and applies force on bracket 402 thereby rotating bracket 402 in a counter clockwise manner as well. Forcing a rotation using adjustment element 650 may be more positive and less prone to vibration loosening. In certain aspects, cams with other shapes can also serve this function.

Adjustment element 650 also comprises a locking mechanism. In the example of FIG. 6 two screws 654a and 654b are used to lock disc 651. In other aspects, a different locking mechanism may be used. Note that although adjustment element 416 is shown as a screw, in certain aspects, adjustment element 416 may also comprise an eccentric cam. An eccentric cam driven by a motor directly or through a gear train can replace a manually adjustable eccentric cam.

Figure 7:
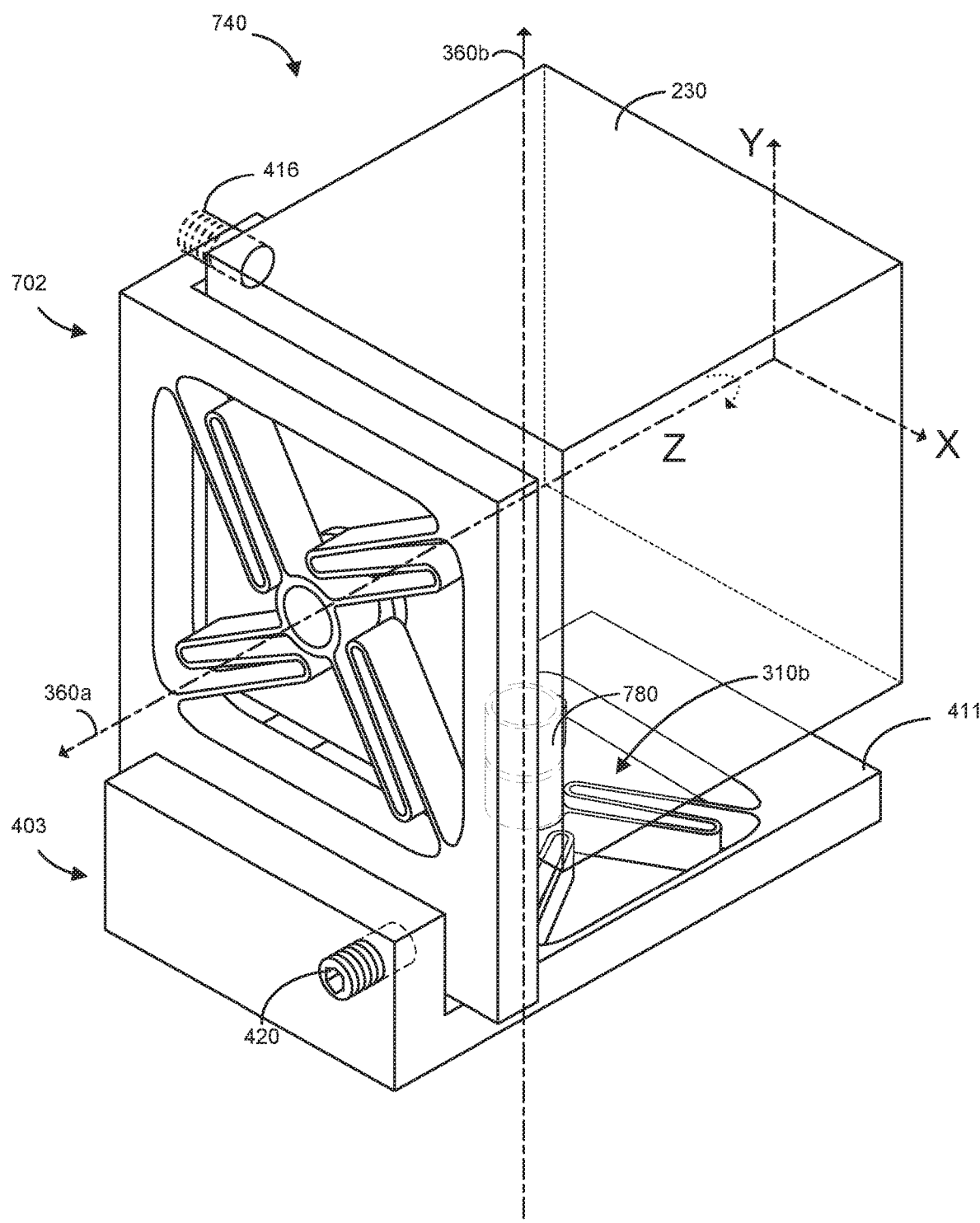
FIG. 7 illustrates an example angle adjustment system using an Oldham coupling, according to some embodiments.

FIG. 7 illustrates another exemplary angle adjustment system 740 comprising bracket 702 and bracket 403. As shown, in angle adjustment system 740, component 230 is directly coupled to connecting element 780. In certain aspects, connecting element 780 comprises an Oldham coupling. An Oldham coupling is a multi-piece (e.g., three-piece) assembly with a balanced design comprised of multiple hubs (e.g., two hubs) and a center disc. The use of an Oldham coupling here is advantageous because the Oldham coupling allows for slight pitch movements (e.g., movements along the Y axis) by component 230 without causing a significant push or pull force on spring arrangement 310b. More specifically, if an Oldham coupling is not used, a rotation of component around axis 360a may, for example, cause component 230 to pull the spring elements of spring arrangement 310b up, which may cause a translational movement along the Y axis. However, an Oldham coupling gets extended (e.g., the gap between the two hubs grows), thereby, ensuring that a pull force is not applied to spring arrangement 310b.

Note that in the example of angle adjustment system 740, because component 230 is directly coupled to spring arrangement 310b, bracket 702 does not need an intermediary plane, such as plane 418. As such, bracket 702 may be identical to bracket 403, meaning that a single part type can be manufactured for use as bracket 702 and bracket 403, thereby, reducing manufacturing costs and complexity.

FIGS. 8A-8D illustrate another example spring arrangement used for adjusting the angular position of a component with respect to at least one axis of rotation while preventing a translational movement or repositioning of the component with respect to the axis of rotation.

Figure 8A:
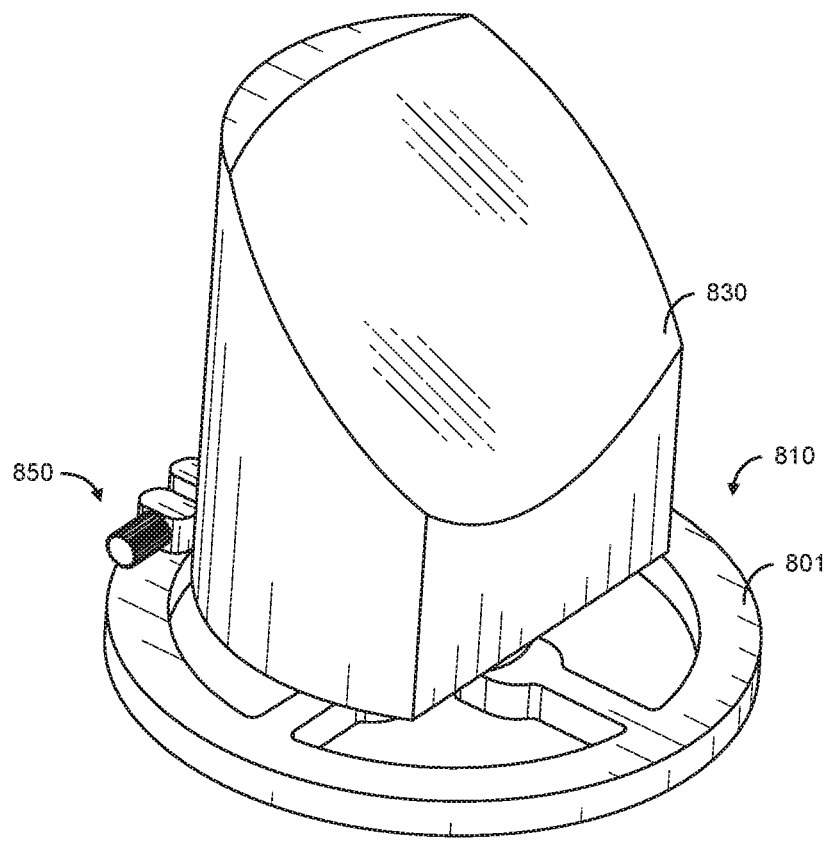
FIGS. 8A-8D illustrate different views of an example spring arrangement, according to some embodiments.

FIG. 8A illustrates a spring arrangement 810 comprising a frame 801 and an adjustment element 850. Spring arrangement 810 is coupled to a component 830, which, in certain aspects may be an optical component. Component 830 is merely an example of a component whose angle may be adjusted using spring arrangement 810. In other example, spring arrangement 810 may be coupled to component 230 instead. Spring arrangement 810's function is similar to spring arrangement 310 of FIGS. 3-7 in that spring arrangement 810 allows for adjusting the angular position of component 830 with respect to at least one axis of rotation (e.g., axis 870 shown in FIG. 8B) while preventing a translational movement or repositioning of the component with respect to the axis of rotation.

Figure 8B:
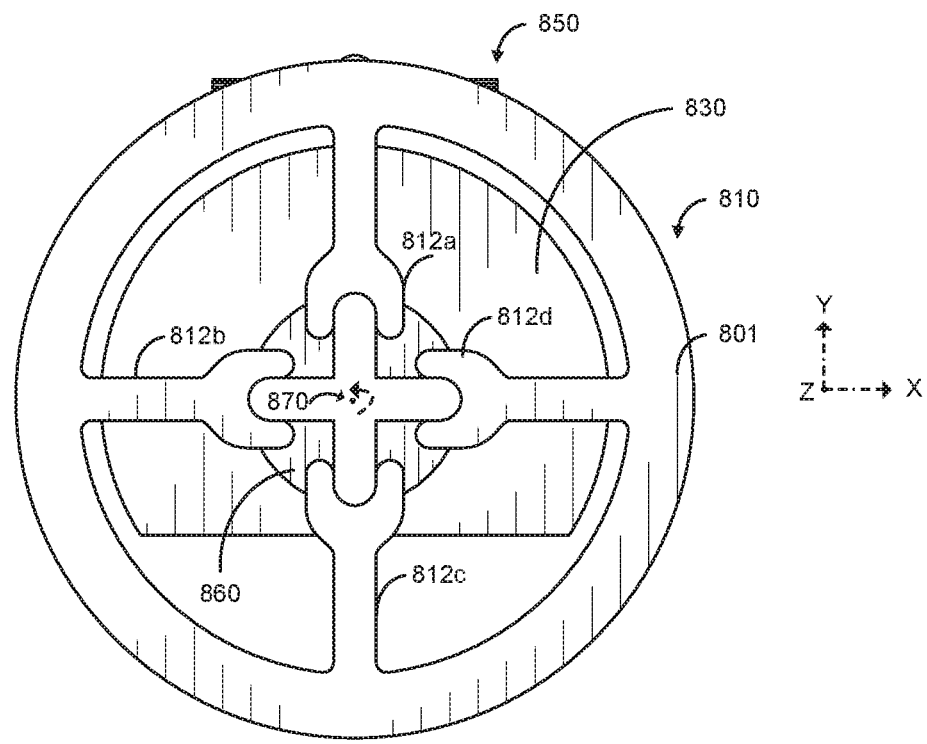

FIG. 8B illustrates an example front view of spring arrangement 810 including four spring elements 812a-812d which are coupled to a connecting element 860 that couples to component 830. Each of elements 812a-812d comprises a fork-shaped tip that is coupled to connecting element 860 and an end that is coupled to frame 801. As shown, the fork-shaped tip of each of elements 812a-812d latches on to one of the four ends of connecting element 860, which has the shape of a cross. In certain aspects, the ends of the cross are press-fitted into the fork-shaped tips of elements 812a-812d. In certain aspects, the ends of the cross are coupled to the fork-shaped tips of elements 812a-812d using an adhesive. Connecting element 860 is coupled to an adjustment element 850.

Using adjusting element 850, component 830 can be rotated around axis of rotation 870 (in both clockwise and counter clockwise directions), which is parallel to the Z axis, as shown. Similar to spring arrangement 310 of FIGS. 3-7, spring arrangement 810 prevents translational movement or repositioning of component 830 with respect to axis 870. In certain aspects, spring arrangement 810 is made from the same material used for manufacturing spring arrangement 310. Also, although the aspects herein describe a spring arrangement 810 with four spring elements 812a-812d, similar to spring arrangement 310, spring arrangement 810 may comprise at least three or more than four spring elements 812.

Figure 8C:
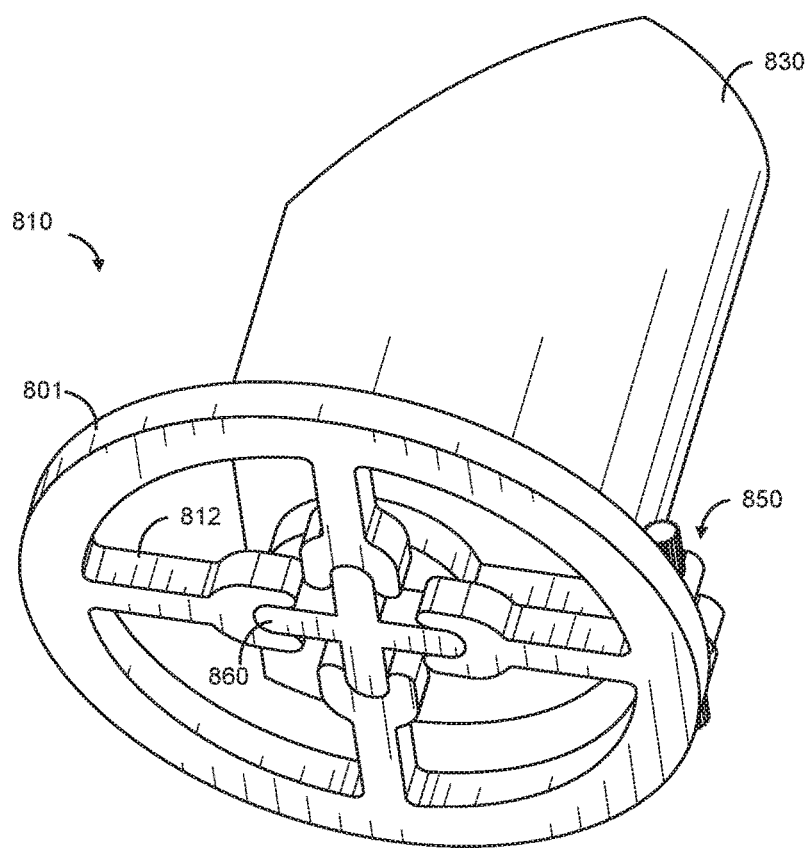
Figure 8D:
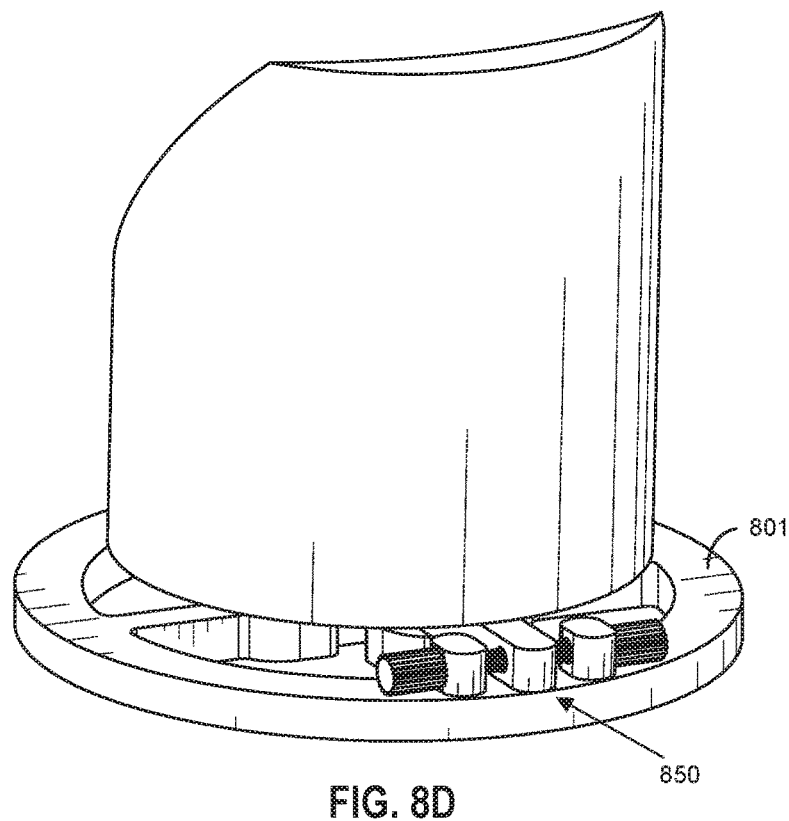

FIGS. 8C and 8D illustrate other views of spring arrangement 810, adjustment element 850, and component 830.

Figure 9A:
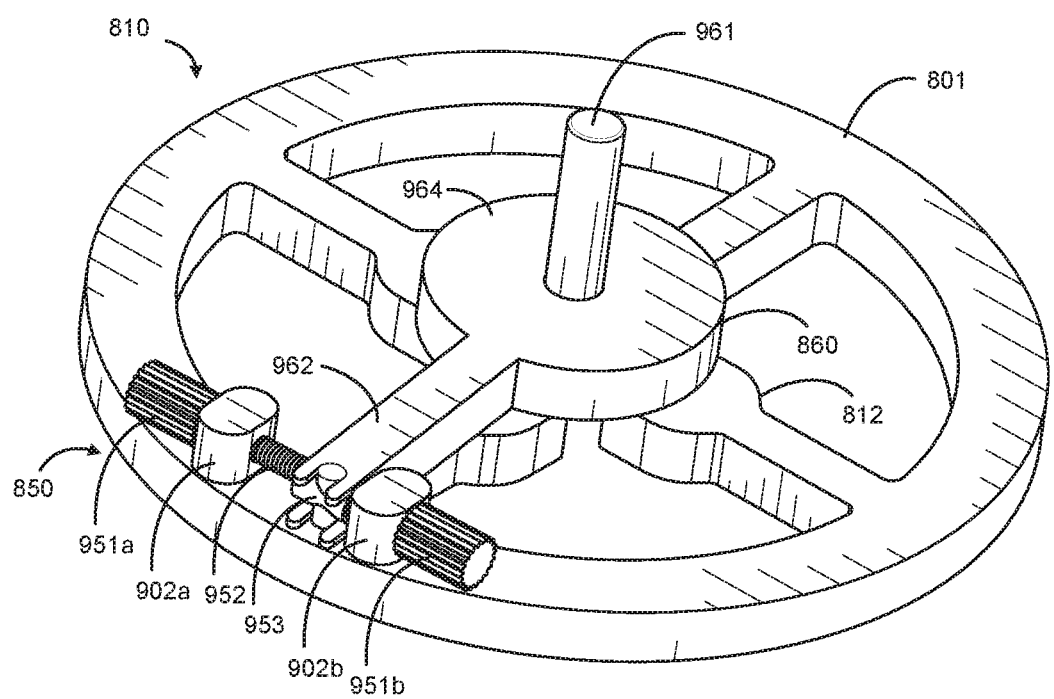
FIGS. 9A-9B illustrate top and bottom views of an adjustment element coupled to the spring arrangement of FIGS. 8A-8D, according to some embodiments.

FIG. 9A illustrates spring arrangement 810 as well as adjustment element 850.

Adjustment element 850 comprises a lever 964 that is coupled to an insert 961 configured to be inserted into a component (e.g., component 830 not shown here). Lever 964 comprises a lever arm 962 that is coupled to a lead nut 953 of adjustment element 850. Lead nut 953 is coupled to a lead screw 952 of adjustment element 850. Adjustment element 850 also comprises two screw couplings 951a and 951b that are coupled to lead screw 952. Turning screw couplings 951 causes lead screw 952 to rotate. Lead screw 952 is held by two holding elements 902a and 902b of frame 801. As shown, holding elements 902a and 902b are configured such that lead screw 952 is able to rotate within the holes provided by holding elements 902a and 902b. Rotating lead screw 952, by turning screw couplings 951, causes lead nut 953 to move translationally along the longitudinal axis of lead screw 952. As lead nut 953 is coupled to lever arm 962, when lead nut 953 moves translationally, lever arm 962 and, therefore, lever 964 rotate clockwise or counter clockwise around an axis of rotation along insert 961 (e.g., axis 870 shown in FIG. 8B). Rotating lever 964 causes a rotation of a component that is coupled to insert 961 along the same axis.

Note that in certain aspects lever 964 may be coupled to a component without the use of insert 961. In such aspects, lever 964 and the component may be coupled together using an adhesive.

Figure 9B:
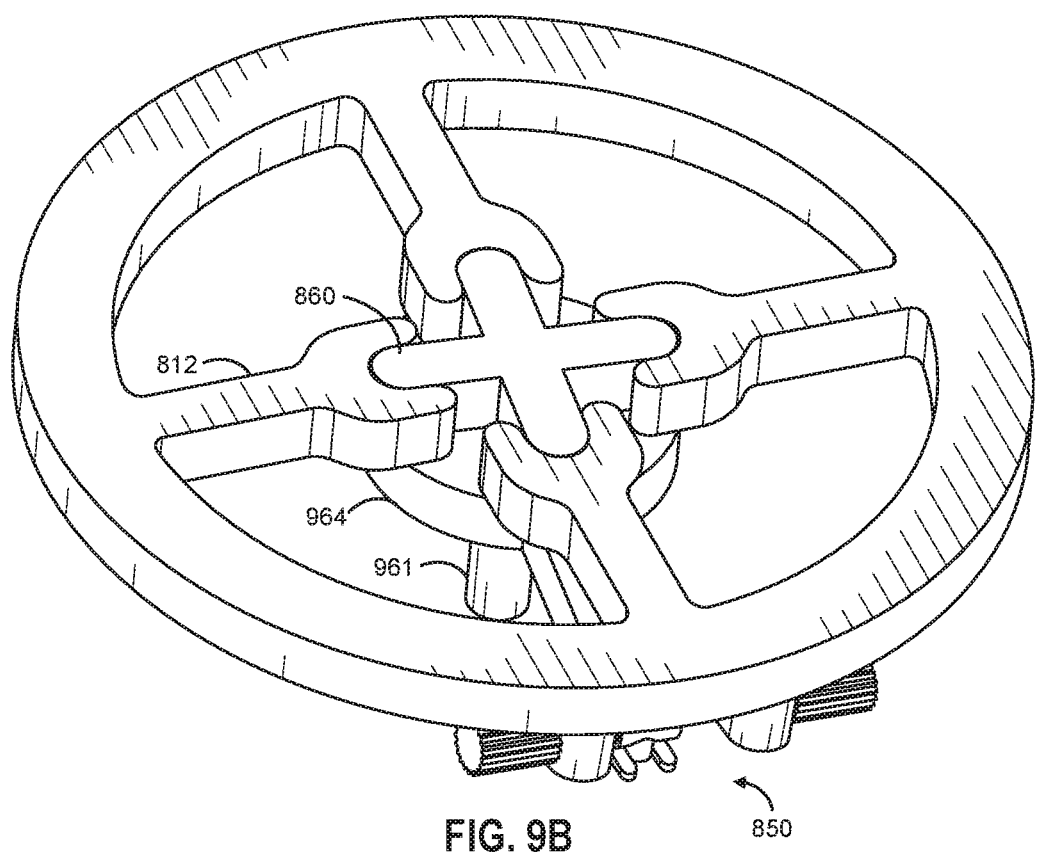

FIG. 9B illustrates a top view of connecting element 860 whose ends are coupled to spring elements 812. As shown, connecting element 860 is coupled to lever 964 of adjustment element 850. In certain aspects, connecting element 860 and adjustment element 850 are coupled together using an adhesive. In certain aspects, connecting element 860 and lever 964 of adjustment element 850 are manufactured as one piece. In certain aspects, connecting element 860 and insert 961 are manufactured as one piece. In such aspects, insert 961 of connecting element is inserted (e.g., press-fitted) into lever 964.

Figure 10A:
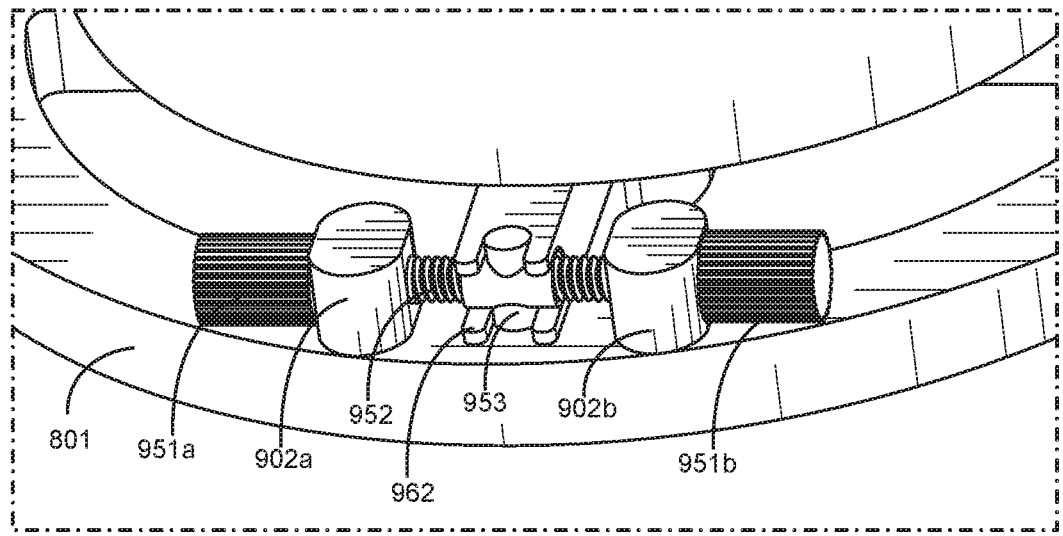
FIGS. 10A-10C show a translational movement of a lead nut of the adjustment element of FIGS. 9A-9B.
Figure 10B:
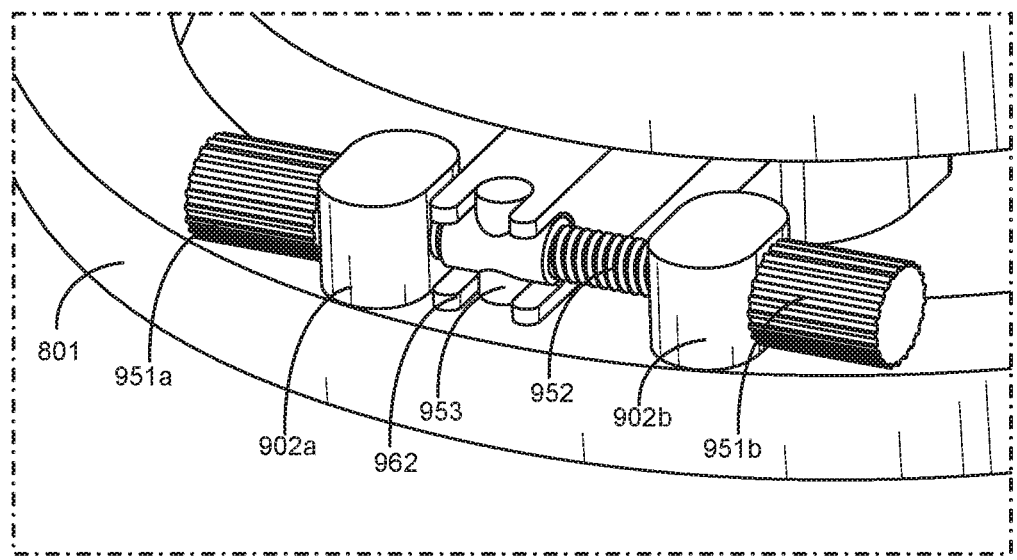
Figure 10C:
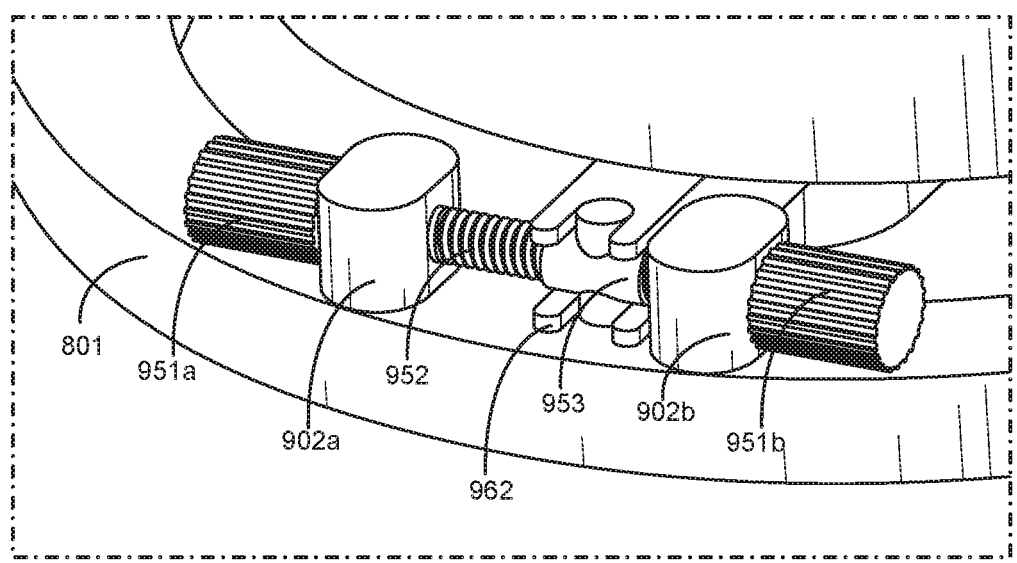

FIGS. 10A-10C show the translational movement of lead nut 953 along the axis of lead screw 952. For example, FIG. 10A illustrates lead nut 953 located at the center of lead screw 952. When screw couplings 951 are turned, lead nut 953 translationally moves to the left or right, thereby, moving lever arm 962 clockwise or counterclockwise. FIG. 10B illustrates lead nut 953, which has translationally moved to the left. FIG. 10C illustrates lead nut 953, which has translationally moved to the right.

Note that any of the spring arrangements (e.g., spring arrangements 310 and 810) described herein can be used in conjunction with any of the adjustment elements (e.g., adjustment elements 416, 420, 650, and 850) for adjusting the angular position of a component, such as component 230 or 830.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The foregoing description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." The word "exemplary" is used herein to mean "serving as an example, instance, or illustration." Any aspect described herein as "exemplary" is not necessarily to be construed as preferred or advantageous over other aspects.

What is claimed is:

1. A device comprising:
   a component; and
   a first spring arrangement coupled to the component, wherein:
     the first spring arrangement comprises at least three spring elements; and
     the first spring arrangement is configured to:
       allow the component to rotate around a first axis of rotation; and
       prevent a first translational movement of the component with respect to the first axis of rotation;
   wherein:
     the at least three spring elements are serpentine-shaped;
     the first spring arrangement is part of a first frame;
     the first frame is part of a first bracket;
     one end of each of the at least three serpentine-shaped spring elements is coupled to the first frame and another end of each of the at least three serpentine-shaped spring elements is coupled to a housing element of the at least three serpentine-shaped spring elements;

the housing element is coupled to a connecting element; and the connecting element couples the first spring arrangement to the component.

2. The device of claim 1, wherein the component is an optical component.

3. The device of claim 2, wherein the optical component comprises at least one of a prism, a beamsplitter, a mirror, or a lens.

4. The device of claim 1, wherein the first spring arrangement comprises four spring elements including the at least three spring elements.

5. The device of claim 1, further comprising:

a first adjustment element that is coupled to the first bracket for rotating the component around the first axis of rotation relative to the first bracket.

6. The device of claim 5, wherein the first adjustment element comprises an eccentric cam.

7. A device comprising:

a component; and a first spring arrangement coupled to the component, wherein:

the first spring arrangement comprises at least three spring elements; and the first spring arrangement is configured to:

allow the component to rotate around a first axis of rotation; and prevent a first translational movement of the component with respect to the first axis of rotation;

wherein:

the at least three spring elements are serpentine-shaped;

the first spring arrangement is part of a first frame; and the first frame is part of a first bracket;

wherein the device further comprises a second spring arrangement, wherein the second spring arrangement is:

part of a second frame, the second frame being a part of a second bracket;

perpendicular to the first spring arrangement; and coupled to the first bracket.

8. The device of claim 7, wherein:

the second spring arrangement comprises at least three additional serpentine-shaped spring elements; and the second spring arrangement is configured to:

allow the component to rotate around a second axis of rotation, the second axis of rotation being perpendicular to the first axis of rotation; and prevent a second translational movement with respect to the second axis of rotation.

9. The device of claim 8, wherein:

a second adjustment element is coupled to the second bracket for rotating the component around the second axis of rotation relative to the second bracket.

10. The device of claim 9, wherein:

the adjustment element rotates the first bracket around the second axis of rotation relative to the second bracket; and the rotation of the first bracket around the second axis of rotation causes the rotation of the component around the second axis of rotation relative to the second bracket.

11. The device of claim 9, wherein the second adjustment element comprises an eccentric cam.

12. The device of claim 7, wherein the component is an optical component.

13. The device of claim 12, wherein the optical component comprises at east one of a prism, a beamsplitter, a mirror, or a lens.

14. The device of claim 7, wherein the first spring arrangement comprises four spring elements including the at least three spring elements.

15. A device comprising:

a component; and a first spring arrangement coupled to the component, wherein:

the first spring arrangement comprises at least three spring elements; and the first spring arrangement is configured to:

allow the component to rotate around a first axis of rotation; and prevent a first translational movement of the component with respect to the first axis of rotation;

wherein:

the at least three spring elements are serpentine-shaped;

the first spring arrangement is part of a first frame; and the first frame is part of a first bracket;

wherein the device further comprises a second spring arrangement, wherein the second spring arrangement is:

part of a second frame, the second frame being a part of a second bracket; and perpendicular to the first spring arrangement.

16. The device of claim 15, wherein the component is coupled to the second spring arrangement using an Oldham coupling mechanism.

17. The device of claim 15, wherein:

the second spring arrangement comprises at least three additional serpentine-shaped spring elements; and the second spring arrangement is configured to:

allow the component to rotate around a second axis of rotation, the second axis of rotation being perpendicular to the first axis of rotation; and prevent a second translational movement with respect to the second axis of rotation.

18. The device of claim 17, wherein:

the second spring arrangement comprises four serpentine-shaped spring elements including the at least three additional serpentine-shaped spring elements; and a second adjustment element is coupled to the second bracket for rotating the component around the second axis of rotation relative to the second bracket.

19. The device of claim 18, wherein:

the second adjustment element rotates the first bracket around the second axis of rotation relative to the second bracket; and the rotation of the first bracket around the second axis of rotation causes the rotation of the component around the second axis of rotation relative to the second bracket.

20. The device of claim 15, wherein the component is an optical component.

21. The device of claim 20, wherein the optical component comprises at least one of a prism, a beamsplitter, a mirror, or a lens.

22. The device of claim 15, wherein the first spring arrangement comprises four spring elements including the at least three spring elements.

* * * * *